Dec. 29, 1964   G. R. A. METCALFE ETAL   3,163,585
FUEL ELEMENT SUPPORT STRUCTURE AND LATCHING MECHANISM
Filed Aug. 11, 1961   8 Sheets-Sheet 4

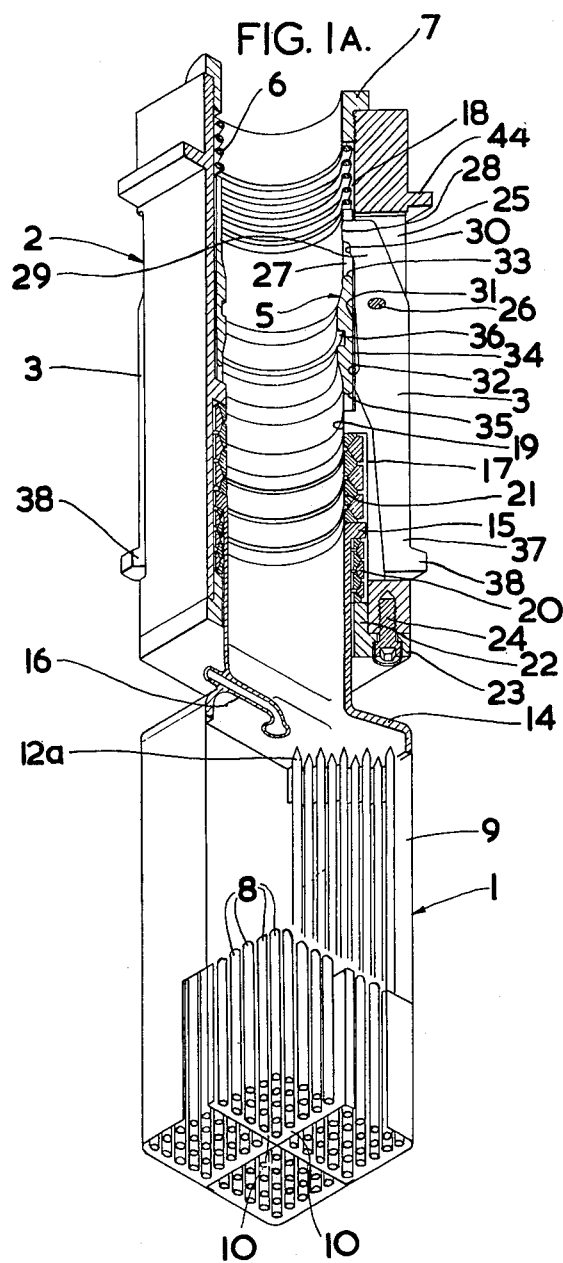

Dec. 29, 1964   G. R. A. METCALFE ETAL   3,163,585
FUEL ELEMENT SUPPORT STRUCTURE AND LATCHING MECHANISM
Filed Aug. 11, 1961   8 Sheets-Sheet 6

United States Patent Office 3,163,585
Patented Dec. 29, 1964

3,163,585
FUEL ELEMENT SUPPORT STRUCTURE AND LATCHING MECHANISM
George Ralph Anthony Metcalfe, Newcastle-upon-Tyne, and Harold Alan Brown, Burton-on-Trent, England, assignors to the United Kingdom Atomic Energy Authority, London, England
Filed Aug. 11, 1961, Ser. No. 130,956
Claims priority, application Great Britain Aug. 11, 1960
1 Claim. (Cl. 176—87)

This invention relates to nuclear fuel elements and is concerned with apparatus for releasably suspending a nuclear fuel element from a support structure disposed above a reactor core.

By suspending fuel elements in a reactor core several advantages are gained; the fuel elements are free to expand; core refuelling may take place above the reactor whereby gravity assists refuelling operations, and in reactors where the fuel elements are cooled by pressurised coolant flowing in an upward direction the arrangement provides some relief for stresses imposed on the support structure by the weight of the fuel elements.

One method of suspending fuel elements in a reactor core is by providing flanged extensions on the upper ends of the fuel elements and by providing the support structure above the reactor core with perforations so that the fuel elements can be passed down through the perforations until the flange of the extensions contacts the upper face of the support structure.

This arrangement, although simple, is not suitable for the reactor of a nuclear powered ship for, should the ship capsize, the fuel elements can fall out of the core and collect to form a mass of uncertain behaviour. The fuel elements should therefore be releasably attached to the support structure in such a manner that, should the relative position of the fuel elements and the support structure become reversed, the fuel elements will remain in the reactor core.

According to the invention, apparatus for releasably suspending a fuel element from a support structure disposed above a reactor core comprises a body part carried by the upper end of the fuel element, a latch member carried by the body part and engageable with the support structure, a latch actuating member for moving the latch member into engaging and disengaging positions with the support structure and means for retaining the latch actuating member in the engaged position.

Figure 1B:
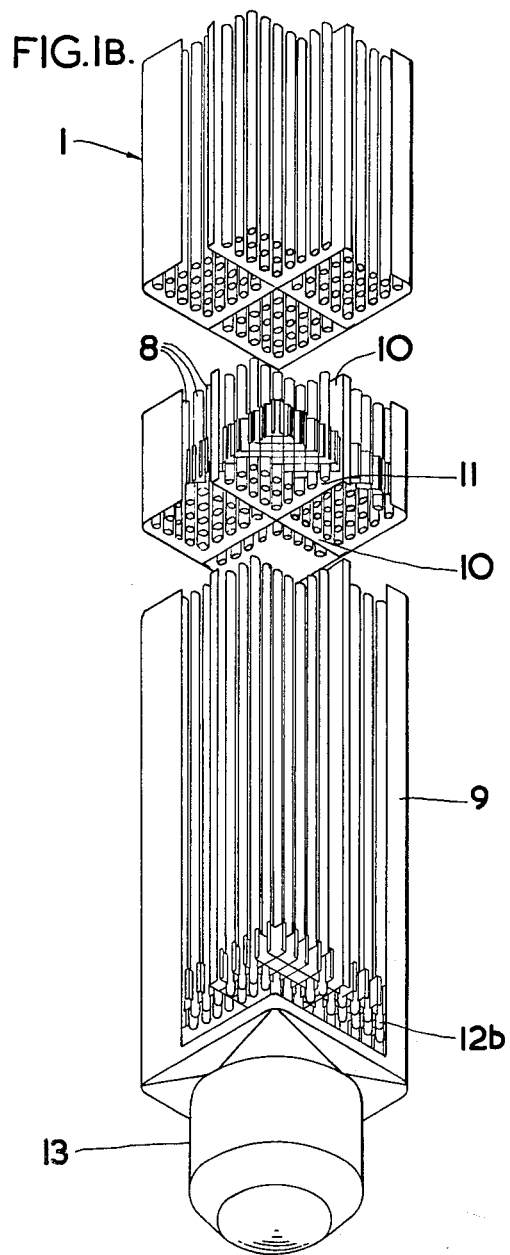
Figure 4:
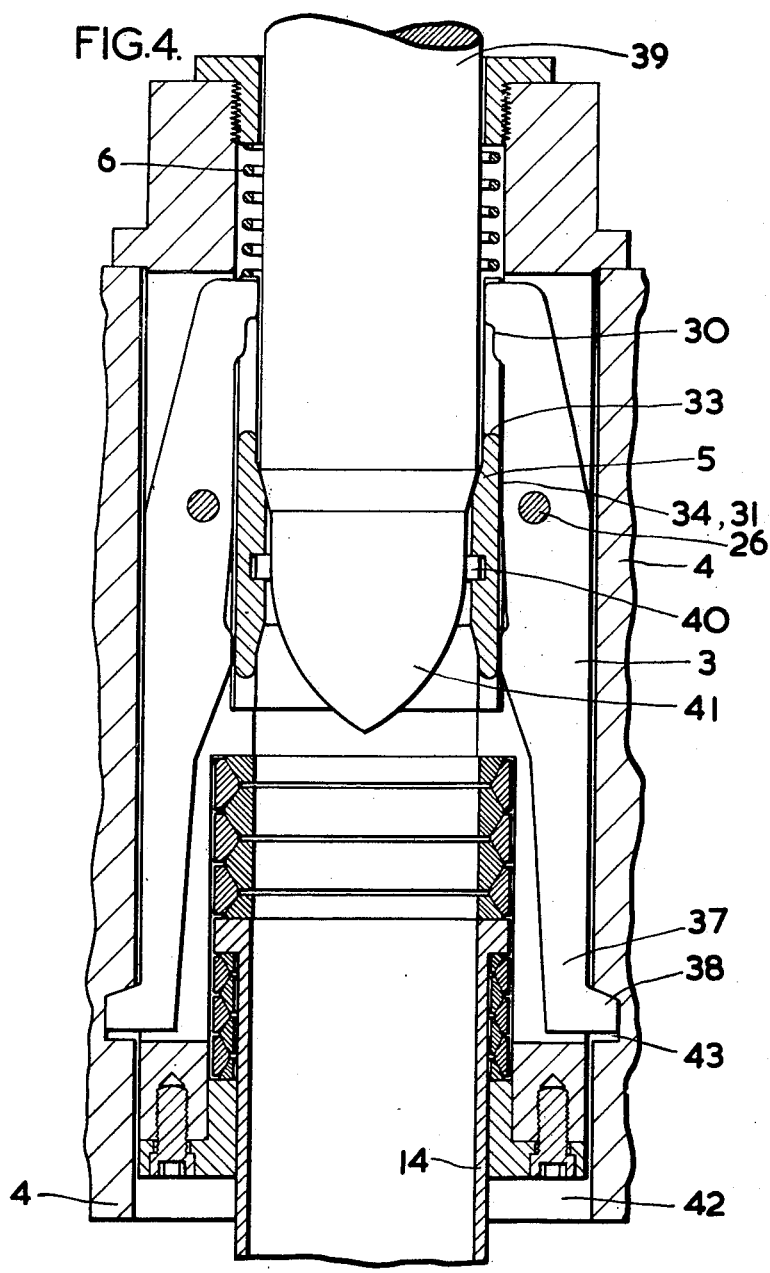
Figure 5:
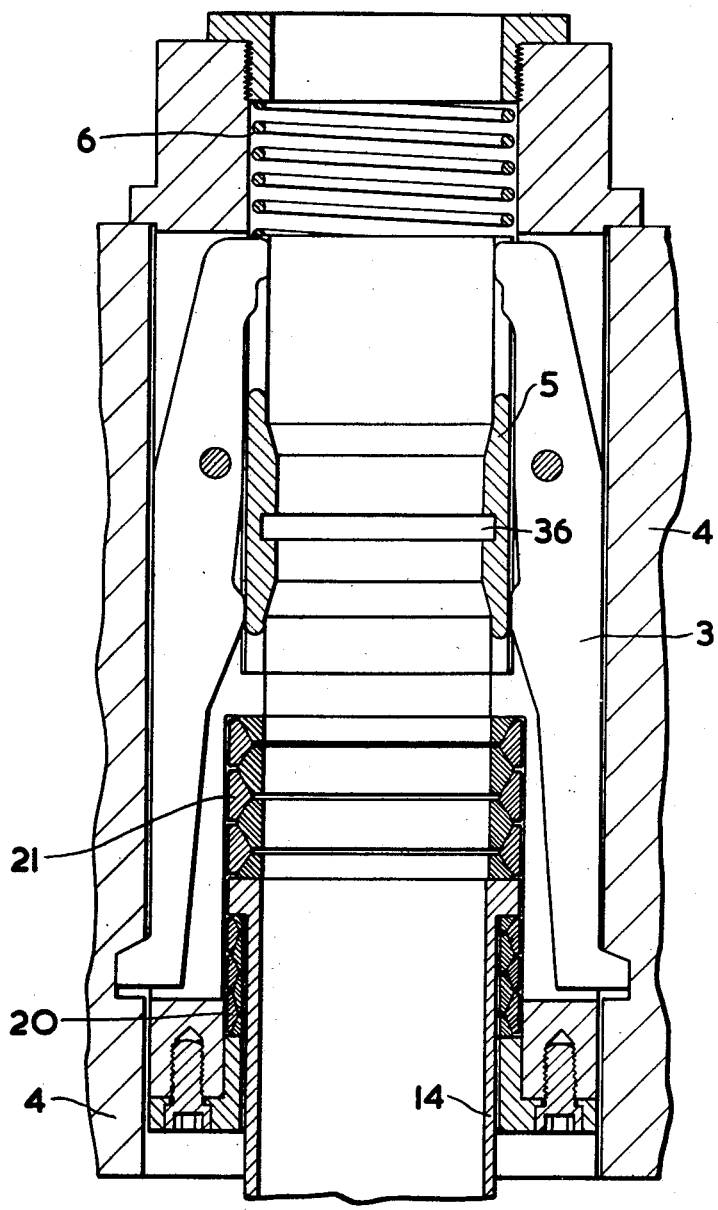
Figure 6:
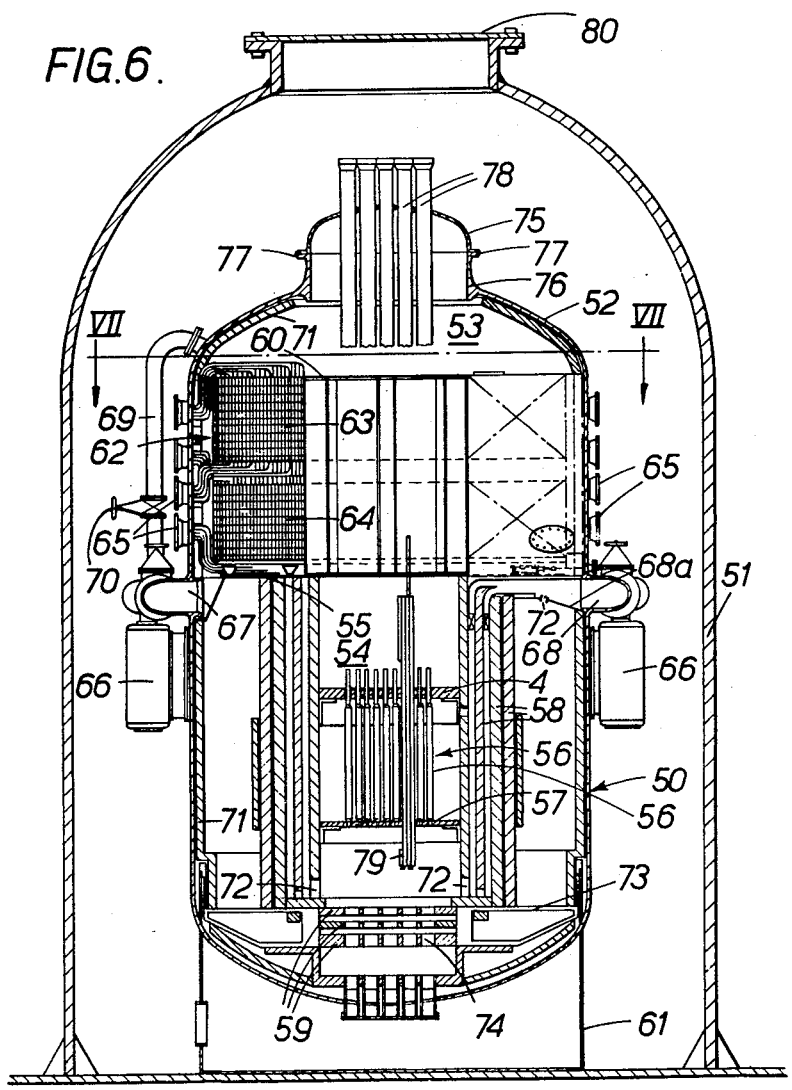
Figure 7:
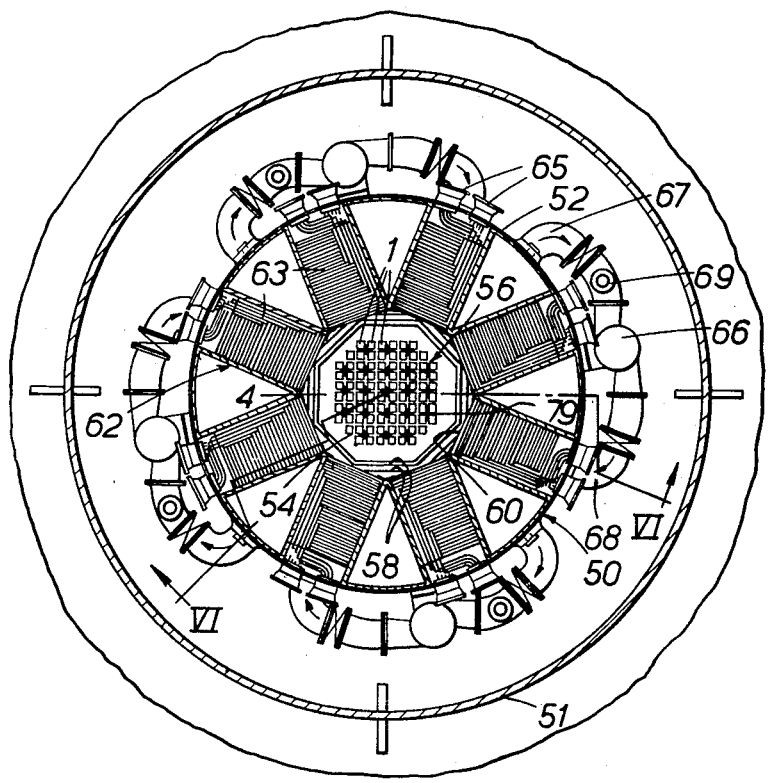

An embodiment of the invention will now be described by way of example with reference to the accompanying drawings wherein:

FIGURES 1A and 1B together form an isometric view in cut away form of the apparatus together with a nuclear fuel element, FIGURES 2, 3, 4 and 5 are fragmental side views in medial section showing the functioning of the apparatus during a refuelling operation, and FIGURES 6 and 7 are sectional views of a ship-borne nuclear reactor incorporating the apparatus.

Referring first to FIGURES 1A and 1B, a nuclear fuel element 1 of the cluster type carries at its upper end a body part 2 carrying three equi-spaced latch members 3 (two only of which are shown) engageable with a fuel element support plate 4 (FIGURES 2 to 5) above a reactor core, an actuating member 5 of sleeve-like form for moving the latch members 3 into engaging and disengaging positions with the support plate 4 and a compression spring 6 disposed between a spring retainer 7 attached to the upper end of the body part 2 and the actuating member 5 for retaining the member 5 in the engaged position (as shown in FIGURE 5).

In greater detail, the fuel element is made up of a close-packed cluster of one hundred individual fuel members 8 contained in a box-like housing 9 the fuel members 8 being divided up into four groups of twenty-five by division plates 10 extending the full lengths of the fuel element 1.

The fuel members 8 of each group are spaced from each other along their length by spacer grids 11. The fuel members 8 are attached by brazing to the upper spacer grids 11 and are free to expand along the remainder of their length. Coolant is caused to flow in an upward direction over the fuel members 8 and the fuel members have streamlined upper and lower ends 12a, 12b to smooth out coolant flow over the members. The fuel members are formed by stacks of $UO_2$ fuel pellets contained in stainless steel sheaths.

The fuel element 1 carries at its lower end a tubular extension 13 which provides location of the lower end of the fuel element in an apertured support plate below the reactor core. The extension 13 has clearance with the aperture in the support plate so as to allow free expansion of the fuel element. The inner walls of the extension 13 define an inlet for coolant.

The upper end of the enclosure 9 carries a tubular extension 14 having a flanged end 15. The extension 14 carries a sampling duct 16 by means of which a portion of the coolant flowing through the fuel element 1 is removed for passage through a radioactivity monitoring device so as to determine the level of activity present in the reactor coolant.

The body part 2 is hollow, to allow outflow of coolant from the fuel element 1, the hollow portion of the body part being defined by stepped bores 17, 18 separated by an internal flange 19. The bore 17 locates the flanged end 15 of the extension 14, the periphery of the flanged end 15 having slight clearance with the walls of the bore 17. The flanged end 15 is held between two shock absorber springs 20 and 21, spring 21 spacing one face of the flanged end 15 from the flange 19 and spring 20 spacing the other face of the flanged end 15 from a spring retainer 22 of sleeve form. The retainer 22 has a flanged end 23 held to the lower face of the body part 2 by set bolts 24.

The latch members 3 reside in slots 25 penetrating the walls of the body part 2 to communicate with the bores 17, 18 and are attached to the body part by pivot pins 26.

The actuating member 5 is located in the bore 18 and has slight clearance therefrom to allow axial movement of the member within the bore. The spring 6 urges the actuating member 5 in a downwards direction, the movement being limited by the flange 19. The actuating member 5 has three longitudinal slots 27 extending from the upper face thereof to about one-third of its length which locate projections 28 on the upper ends 29 of the latch members 3.

The lower ends 37 of the latch members 3 have projections 38 and the inner faces of the members 3 have stepped portions 30, 31, 32 which co-act with faces 33, 34, 35 on the actuating member 5 in a manner to be described. The inner wall of the member 5 is recessed to define an annular groove 36.

FIGURES 6 and 7 show a nuclear reactor 50 enclosed within a mild steel containment vessel 51 in the reactor compartment of a ship. The reactor 50 has a mild steel pressure vessel 52 supported by a skirt 61 and filled with "Santowax R," a terphenyl-based organic liquid moderator and coolant (see Papers Nos. 421 and 1779 by C. A. Trilling, 1958 Geneva Conference on the Peaceful Uses of Atomic Energy, volumes 9 and 29, respectively, wherein organic cooled and moderated nuclear reactors and their moderator/coolants are described in detail).

The pressure vessel 52 is lined with a mild steel thermal shield 71 and is divided into an upper region 53 and a lower region 54 by an annular baffle plate 55. The lower region 54 contains the reactor core 56 which is formed by eighty-eight fuel elements 1 the upper ends of which are suspended from the support structure 4. The lower ends of the fuel elements 1 are located by a perforated plate 57. The fuel elements 1 are spaced on a square pitch with the spaces between serving as a moderator space.

Adjacent the sides and bottom of the core 56 are a series of spaced plates 58 and 59 respectively. The plates 58, 59 are of mild steel and combine with the reactor coolant/moderator (which is a hydrocarbon) to shield the core 56. The combination reduces radiation external the pressure vessel 52 to a tolerable level and hence dispences with external shielding. A 20 ft. head of coolant/moderator above the reactor core 56 provides adequate shielding without the need of steel plates.

The upper region 53 contains a tubular baffle 60 of boron steel extending upwards from the baffle plate 55 to define an annular space with the inner wall of the pressure vessel 52, which space houses eight steam-generating heat exchangers 62 shielded from the core 56 by the coolant/moderator and the boron steel baffle 60. The heat exchangers 62 have superheater sections 63, evaporator sections 64 and external steam/water connections 65.

The coolant/moderator is circulated at 100 lbs. per square inch pressure by four electrically-driven pumps 66 disposed external the pressure vessel 52. The pumps 66 have inlets 67, outlets 68 and by-pass connections 69 with valves 70 all connected to the pressure vessel 52. The moderator/coolant follows a path up through the reactor core 56, up through the tubular baffle 60 and then down over the heat exchangers 62 to enter the pump inlets 67. The liquid is then discharged from the pump outlets 68 to return to the reactor core 56 through two separate paths, the first path being first between the steel plates 58 and then through apertures 72 in the lower ends of two of the plates 58 and the second path being first through apertures 68 in the pump outlets 68, then between the outermost plate 58 and the thermal shield 71, over a spider-shaped structure 73 supporting the plates 58 and finally up through cruciform-shaped holes 74 in the steel plates 59 below the core 56.

The upper end of the pressure vessel 52 is closed by a flanged dome 75 sealed to a flanged extension 76 of the vessel 52 by a weld joint 77. The dome 75 locates twenty-one stand pipes 78 which house hoisting equipment for a similar number of cruciform-shaped control rods 79. The control rods 79 are of 4% boron steel clad in stainless steel and are disposed on a square lattice, movement into and out of the reactor core 56 being between the fuel elements 1. When the control rods 79 are fully extended into the core 56, the lower ends of the rods 79 are located by the holes 74 in the plates 59.

To refuel the reactor 50 the reactor is first shut down and the pumps 66 stopped. The weld joint 77 is then cut away and the dome 75 removed through a manhole 80 in the containment 51.

Figure 2:
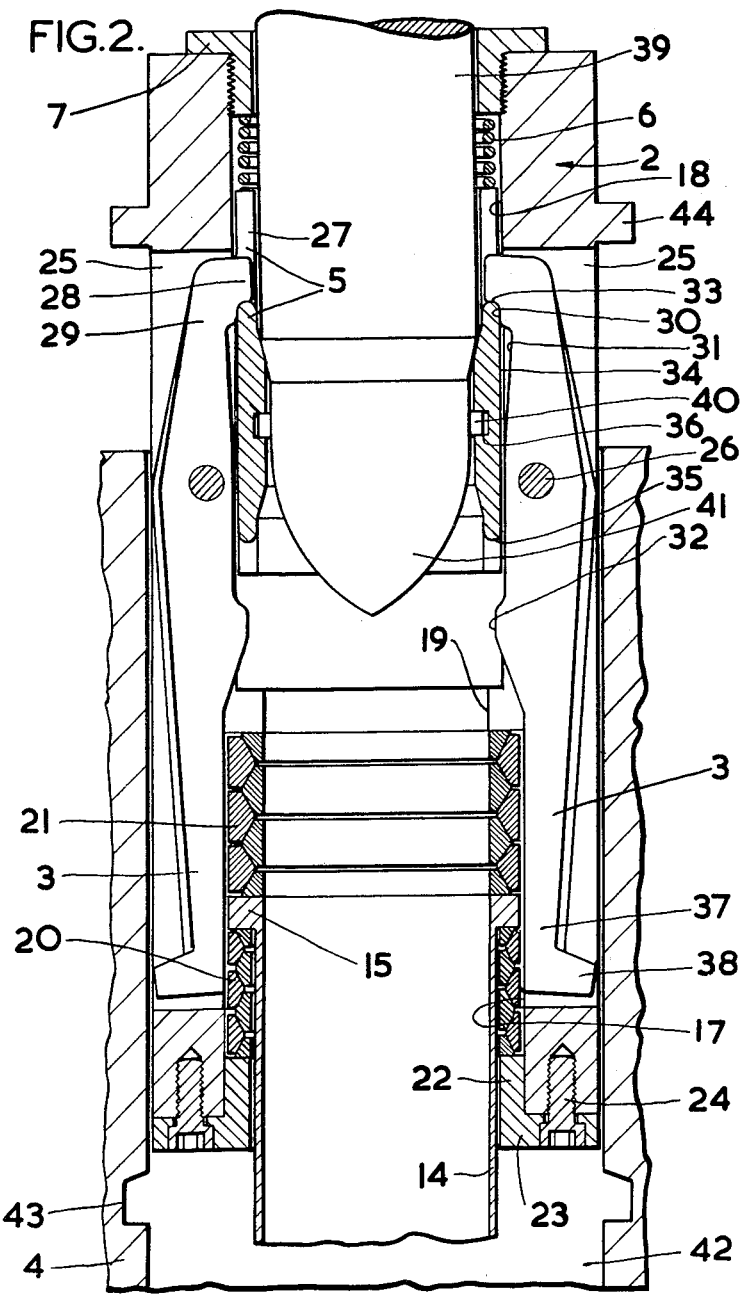

The refuelling operation will now be described by way of reference to FIGURES 2, 3, 4 and 5. With reference first to FIGURE 2, under the protection of the head of moderator coolant above the reactor core 56, a fuel element 1 (as represented by its extension 14) is about to be lowered into the reactor core by a core refuelling grab 39 having a nose 41 equipped with retractable pegs 40 engaging with the groove 36 of the actuating member 5. In the position shown, the weight of the fuel element 1 is sufficient to urge the body part 2 in a downward direction, against the loading of the spring 6 and to cause the face 33 of the actuating member 5 to exert a thrust upon the stepped portions 30 of the latching members 3. The thrust exerted upon the members 3 pivots the members about their pins 26 to ensure that the projections 38 on the lower ends 37 of the members 3 are kept clear of the walls of an aperture 42 penetrating the support plate 4.

Figure 3:
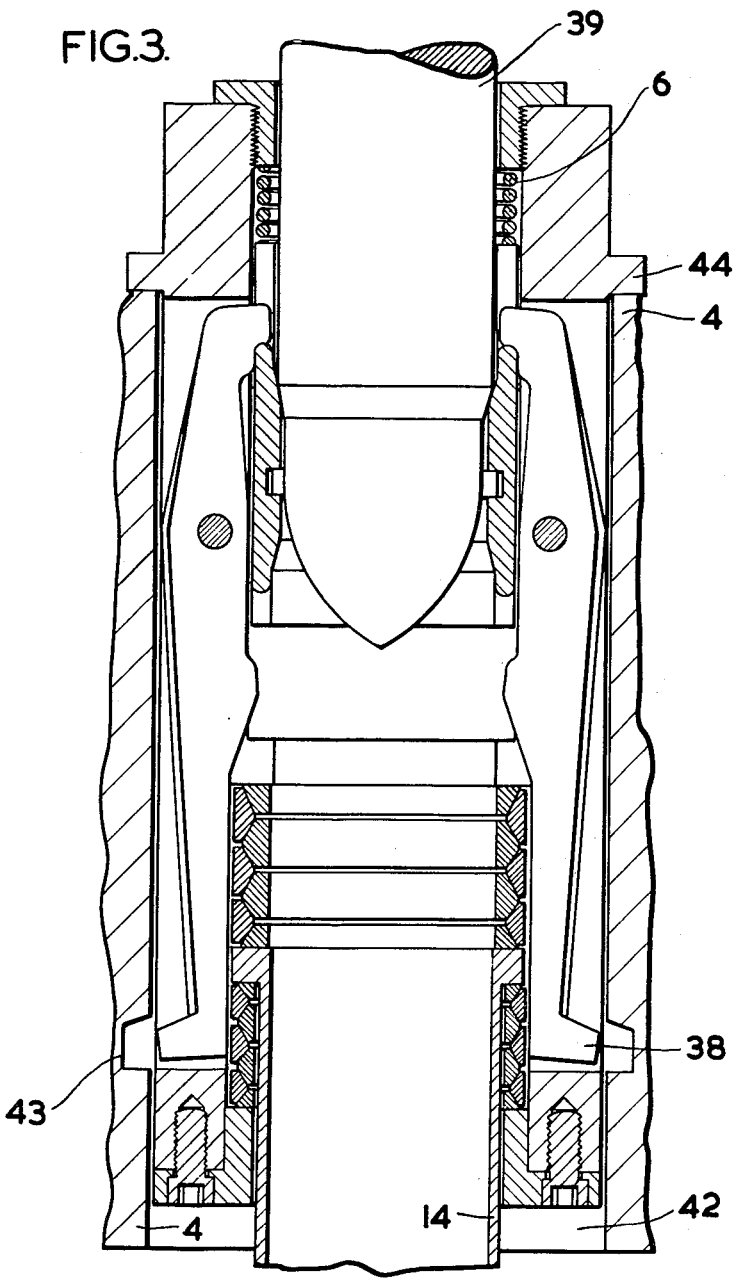

With reference now to FIGURE 3, the grab 39 (and hence the body part 2 and the attached fuel element) is lowered further until the projections 38 on the lower ends of the latching members 3 are opposite an annular groove 43 in the walls of the aperture 42 penetrating the support plate 4. In this position the tubular extension 13 (FIGURE 1B) on the lower end of the fuel element 1 enters its locating aperture in the support plate 57 below the reactor core 56 and a stop 44 on the upper end of the body part 2 contacts the upper face of the support structure 4 to prevent further movement in a downward direction of the body 2.

With reference now to FIGURE 4, the grab 39 is lowered still further until the face 33 of the actuating member 5 is clear of the stepped portions 30 of the latching members 3 and the face 34 now contacts the stepped portion 31.

Further downward movement of the grab 39 causes the latching members 3 to pivot about their pins 26 until their projections 38 on their lower ends 37 engage with the groove 43 in the walls of the aperture 42. The pegs 40 on the nose 41 of the grab 39 are now retracted and the grab 39 withdrawn as shown in FIGURE 5. The member 5 is now held in the position shown in FIG. 5 by the spring 6 until moved once again by the grab 39.

To remove a fuel element 1 from the reactor core the above operations are reversed, the removed fuel element being withdrawn into a shielded coffin positioned on the pressure vessel extension 76.

In the event of the ship capsizing and the relative positions of the fuel element 1 and body part 2 being reversed, the fuel elements are retained within the reactor core 56 and remain supported by the support structure 4.

The apparatus has advantages over locking devices employing screw threaded parts for the reason that, in organic-liquid cooled nuclear reactors, the coolant may find its way between the screw threads whereupon prolonged irradiation results in decomposition and "coking" which can cause binding between the screw threads of the parts.

The apparatus described has a further advantage in shipborne reactors in that under water shock loads are not transmitted to the fuel elements of the reactor to the same extent as would be the case where the fuel elements were rigidly clamped to a support plate. In the present arrangement such shock loads are absorbed in the springs 20, 21.

We claim:

In a nuclear reactor: a support structure disposed horizontally above the reactor core and defining an aperture, a bore-defining body part disposed coaxially in said aperture, a pair of first spring means disposed in tandem in the bore of the body part, a flange member separating the spring means, a tubular member having a longitudinal axis and depending from the flange member, nuclear fuel disposed within the tubular member, a latch member pivotally mounted in the wall of the body part so as to pivot about an axis perpendicular to the axis of the tubular member, means defining a latch-holding recess in the wall of said aperture, a sleeve member slidably mounted in the bore of the body part, cam means on the sleeve member co-acting with the latch member so that axial movement of the latch member causes pivoting of the latch member into engaging and disengaging positions with said latch-holding recess and second spring means urging said sleeve member into a latch-engaging position.

References Cited in the file of this patent
UNITED STATES PATENTS

| | | |
|---|---|---|
| 2,851,410 | Vernon et al. | Sept. 9, 1958 |
| 2,885,007 | Hoffer | May 5, 1959 |
| 3,009,868 | Moulin | Nov. 21, 1961 |

FOREIGN PATENTS

| | | |
|---|---|---|
| 35/7526 | Japan | Aug. 28, 1959 |